United States Patent
Maxwell, Jr. et al.

(10) Patent No.: US 6,816,758 B2
(45) Date of Patent: Nov. 9, 2004

(54) PROGRAMMABLE CONTROLLER FOR REMOTELY CONTROLLING INPUT POWER THROUGH A SWITCH TO A LOAD AND AN ASSOCIATED METHOD OF OPERATION

(75) Inventors: John M. Maxwell, Jr., Eva, AL (US); Kerry Michelle Offer, Madison, AL (US); Dale B. Ramsey, Sommerville, AL (US); Charles R. Schwarz, Huntsville, AL (US); Rodney M. Hornsby, Madison, AL (US)

(73) Assignee: The Boeing Company, Seattle, WA (US)

( * ) Notice: Subject to any disclaimer, the term of this patent is extended or adjusted under 35 U.S.C. 154(b) by 590 days.

(21) Appl. No.: 09/842,967

(22) Filed: Apr. 26, 2001

(65) Prior Publication Data

US 2002/0162033 A1 Oct. 31, 2002

(51) Int. Cl.$^7$ .............................. G05F 1/70; G06F 19/00
(52) U.S. Cl. ....................... 700/292; 700/286; 323/241; 361/57
(58) Field of Search ............................... 361/57, 58, 1, 361/93.1, 93.8; 323/211, 241; 700/286, 292; 307/112, 113

(56) References Cited

U.S. PATENT DOCUMENTS

| | | | |
|---|---|---|---|
| 4,556,882 A | | 12/1985 | Brifman et al. |
| 5,606,482 A | * | 2/1997 | Witmer ..................... 361/93.7 |
| 5,631,545 A | * | 5/1997 | Norman et al. ............. 323/205 |
| 5,726,843 A | | 3/1998 | Arita et al. |
| 6,127,882 A | | 10/2000 | Vargha et al. |
| 6,377,031 B1 | * | 4/2002 | Karuppana et al. ......... 323/220 |

FOREIGN PATENT DOCUMENTS

DE 3121409 A1 12/1982

* cited by examiner

Primary Examiner—Jayprakash N. Gandhi
(74) Attorney, Agent, or Firm—Alston & Bird LLP

(57) ABSTRACT

A programmable controller is provided that is capable of interfacing with a remote master controller, where the programmable controller is capable of controlling an input current to at least one load that is proximate the programmable controller. The programmable controller includes at least one solid-state switch capable of controllably altering the input current to the loads. The programmable controller also includes at least one measuring element for measuring at least one parameter associated with the loads and the solid-state switches, such as the current through the solid-state switches, the current through and voltage drop across the loads and/or the temperature at or around the solid-state switches. Additionally, the programmable controller includes a processing element capable of controlling the solid-state switches, such as by controlling the current through the solid-state switches to the loads.

80 Claims, 8 Drawing Sheets

PROGRAMMABLE CONTROLLER FOR REMOTELY CONTROLLING INPUT POWER THROUGH A SWITCH TO A LOAD AND AN ASSOCIATED METHOD OF OPERATION

FIELD OF THE INVENTION

The present invention relates generally to switches and, more particularly, to an apparatus and method for remotely controlling the current to at least one load.

BACKGROUND OF THE INVENTION

In many industries today, such as the avionics and automotive industries, in order to protect complex and costly electrical components, systems and subsystems, electrical power systems powering these components, systems and subsystems employ circuit breakers and relays. Typically, circuit breakers interrupt the current in an electric circuit, sometimes referred to as tripping the circuit breaker, when the current through the circuit becomes higher than that allowed by the circuit breaker. Conventional circuit breakers are typically rated for a specific current level that depends upon the components in the circuit and their current tolerances. When the current through the circuit breaker exceeds the rated current level, the circuit breaker trips and interrupts the current in the circuit. In one type of conventional circuit breaker, a mechanical circuit breaker, when enough current runs through the circuit to trip the circuit breaker, a pair of contacts that are normally in contact in order to conduct current through the circuit breaker and the rest of the circuit are separated, such as by preloaded springs, thus breaking the circuit.

In addition to circuit breakers, many industries today employ relays to control the flow of current to components, systems and/or subsystems. Conventional relays are electromechanical switches that are operated by a flow of current in one circuit which controls the flow of current in another circuit. One basic conventional relay consists of an electromagnet with a soft iron bar, or armature, disposed close to the electromagnet. A movable contact is connected to the armature such that the contact is held in a normal position by a spring, or similar device. To actuate the relay, the electromagnet is energized, such as by passing a current through it, thereby exerting a force on the armature which, in turn, causes the contact to overcome the pull of the spring and move so as to either complete or break the circuit. When the electromagnet is de-energized, such as by halting the current flow through the electromagnet, the contact returns to its original, normal position.

While conventional circuit breakers and relays are used in many power systems, they pose some problems. Many conventional circuit breakers and relays allow excessive current to flow when the contacts open and close the circuit. In these circuit breakers and relays, the excessive current flow results in an electric arc that forms at the contacts, which typically erodes the contacts and can, in some instances, weld them closed. The electric arc can also result in the contacts becoming carbonized, thereby not allowing the contacts surfaces to adequately conduct electrical current. Additionally, the presence of the electric arc can add unnecessary danger to electrical devices and people around such devices in instances in which combustible gases have collected around the circuit breaker or relay.

To allow access to conventional circuit breakers and relays, in many conventional power systems, they are placed on centrally located panels in areas that are typically distant from the components, systems and/or subsystems being protected and/or controlled. This results in long cable assemblies that extend between the circuit breakers and/or relays and the components, systems and/or subsystems being protected and/or controlled. The length of the cables can additionally result in parasitic impedance, which can cause a loss of power to the system, and can increase system noise. This results in lowering the efficiency of the power system. Additionally, longer cables also increase the weight of the power system, because, as stated, the cables must reach extended lengths to control the various components and/or subsystems.

In addition to lower reliability and increased weight of conventional mechanical circuit breakers and relays, conventional mechanical circuit breakers suffer from limitations due to their material characteristics. Most of these conventional circuit breakers cannot be adjusted for different requirements without replacing the entire circuit breaker. For example, if a mechanical circuit breaker is rated for a ten amp trip and is attached to a circuit containing a component, system or subsystem rated for five amps, the ten amp rated circuit breaker would need to be replaced with a five amp rated circuit breaker to provide over-current protection for the five amp rated component, system or subsystem. Additionally, conventional mechanical circuit breakers do not allow for adjustments accounting for power-up inrush current, or adjustments in trip voltages accounting for fluctuations in the voltage drop across a mechanical circuit breaker due to temperature changes in the circuit breaker.

SUMMARY OF THE INVENTION

In light of the foregoing background, the present invention provides a programmable controller capable of interfacing with a remote master controller, where the programmable controller is capable of controlling an input current to at least one load, such as a component and/or subsystem that is proximate the programmable controller. The programmable controller of the present invention includes at least one solid-state switch capable of limiting the input current to the loads to a predetermined value at or below the maximum current rating of the solid-state switch. In one embodiment, each solid state switch includes a switching element electrically connected to a respective load to monitor and control the input current and voltage levels to the respective load, and a drive element to provide the input current to the respective load. In this embodiment, the switching element controls the input current provided by the drive element. Using a solid-state switch, such as a metal oxide semiconductor field-effect transistor (MOSFET) or an integrated gate bipolar transistor (IGBT), the programmable controller eliminates the mechanical contacts of conventional circuit breakers and relays, thus eliminating the erosion and associated problems with such contacts.

The programmable controller also includes at least one measuring element for measuring at least one parameter associated with the loads and the solid-state switches. For example, in various embodiments, the programmable controller can measure the current through the solid-state switches, the current through and voltage drop across the loads and the temperature at or around the solid-state switches. Using these parameters, the programmable controller can protect the loads and solid-state switches from damage, such as that caused by over current, over voltage, under voltage, over temperature and under temperature conditions.

The programmable controller of the present invention also includes a processing element, such as a microcontroller, electrically connected to the solid-state switches and measuring elements. The processing element is capable of controlling the solid-state switches. For example, the processing element can control the respective switches in an on mode where the solid-state switch permits a respective load to receive the input current, or an off mode where the solid-state switch prevents the respective load from receiving the input current.

In one embodiment, the programmable controller can further include a memory device electrically connected to the processing element for storing information relative to the switches and/or loads in addition to user preferences and built-in-test information. To backup the operation of the processing element, in another embodiment, the programmable controller further includes a monitoring element electrically connected to the processing element and the solid-state switches. In instances when the processing element fails to function properly by failing to control the solid-state switches, the monitoring element is capable of controlling the solid-state switches to alter the input current to a predefined level.

By using a processing element to control the solid-state switches and measuring elements, the programmable controller of the present invention provides flexibility in power control not available in conventional circuit breakers or relays. Using the processing element, and placing it near the components and/or subsystems, the programmable controller reduces the amount of cabling required in electrical devices employing conventional circuit breakers and/or relays, and overcomes the material limitations of conventional circuit breakers and relays. By reducing the lengths of the cabling required by the power system, the programmable controller improves the efficiency by reducing the parasitic impedance within the cabling. Reducing the cabling also reduces the weight of the electrical devices.

Using a processing element also allows the programmable controller of the present invention to overcome the material limitations of conventional circuit breakers and relays. In the previous example, if a five amp rated load is connected to a conventional ten amp rated circuit breaker, the circuit breaker would need to be replaced with a new, five amp rated circuit breaker to protect the load. But using the programmable controller of the present invention, the processing element need only be configured for the particular load, such as the current requirement of the load, and can be reconfigured (or reprogrammed) for a different load. For example, the processing element can be programmed and reprogrammed depending on such load characteristics as current, voltage and temperature ratings of the load. The processing element can also be programmed and reprogrammed depending upon characteristics of the solid-state switch, thereby allowing for even greater flexibility. Additionally, using one processing element to control multiple loads, allows one programmable controller to be independently configured for multiple, different loads, without using multiple, different types of conventional circuit breakers.

In embodiments including a switching element and a drive element, the switching element can have a maximum current rating, and each solid-state switch can further include a switch-protection element electrically connected to the switching element and the drive element. The switch-protection element protects the solid-state switch from overcurrent by sensing an actual current through the switching element and controlling the input current to loads depending upon the actual current and the maximum current rating. For example, the switch protection element can control the drive element to provide the input current to a respective load such that the actual current through the switching element is no more than the maximum current rating of the respective switching element. Additionally, to allow for an inrush of current through the switching element when it is initialized, the switch-protection element can, alternatively or additionally, control the drive element to wait to control the actual current through the switching element until after a predefined period of time or can be configured to control the current in different manners at different times or in different modes of operation.

The present invention also provides a system of remotely controlling at least one load, including a master controller for controlling an input current to the at least one load, and at least one slave controller situated remote from the master controller and proximate the loads, where the slave controller is electrically connected between the master controller and the load. The slave controller includes the solid-state switches, the measuring elements and the processing element. And in one embodiment, the system further includes a user interface electrically connected to the master controller. The user interface allows a user to control the input current to the loads.

In operation, the processing element is configured based upon at least one characteristic, such as a current rating of each load, a voltage rating of each load, a maximum current rating of each switch and/or a temperature rating of each switch. Then the processing element monitors, such as via the measuring elements, at least one parameter associated with each switch and respective load, such as the input current to the load, a voltage drop across the load, the input current through the switch and/or a temperature of the switch. Then the processing element determines a condition of each switch and respective load depending upon at least one of the at least one characteristic and the at least one parameter. Then, the processing element operates each switch to control the input current to each load, such as by operating each switch in the on mode or placing each switch in the off mode, where the mode selected depends upon the condition of the respective load and switch.

As previously stated, the programmable controller can protect the loads and solid-state switches from damage caused from over current, over voltage, under voltage, over temperature and under temperature conditions. To protect each switch for instantaneous over current, in embodiments including a switch-protection element, the switch-protection element can determine the condition of each switch based upon the maximum current rating of the switch and the input current through the switch, and thereafter control the switch. For example, the switch-protection element can operate the switch in the on mode when the input current through the switch is no more than the maximum current rating for that switch, and place the switch in the off mode when the input current through the switch exceeds the maximum current rating. As previously stated, to allow for inrushes of current, the switch protection element can, alternatively or additionally, wait a predefined period of time to allow the inrush of current to settle before checking to determine if the switch should be placed in the off mode.

In protecting each load from over currents, the processing element of the programmable controller can determine the condition of each load based upon the current rating of the load and the input current to the load. For example, in one embodiment, when the input current to a respective load is not more than a predetermined value relative to the current rating of the load, the processing element operates the respective switch in the on mode. But, on the other hand, when the input current to the respective load exceeds the predetermined value, the processing element operates the switch by placing it in the off mode. In another embodiment, the processing element can additionally consider an amount of time the load has received the input current when determining the condition of the respective load. And in a further embodiment, the processing element can account for previous current stresses on the switch and/or the load (e.g., when the input current exceeds the predetermined value) by maintaining a count that increases as the input current remains above the predetermined value, and that decreases once the input current falls below the predetermined value.

To protect each load from over voltage conditions, in one embodiment, the processing element determines the condition of each load based upon the voltage rating of the load and the voltage drop across the load. If, for example, the voltage drop across a respective load is no more than a predetermined value relative to the voltage rating of the load, the processing element operates the respective switch in the on mode. If the voltage drop exceeds the predetermined value, however, the processing element operates the switch by placing it in the off mode. To protect each load from under voltage conditions, the processing element can operate the respective switch in the on mode when the voltage drop across a respective load is no less than the predetermined value and placing it in the off mode when the voltage drop is below the predetermined value.

In one advantageous embodiment, the processing element protects each switch from over heating by first determining the condition of each switch based upon the temperature rating of the switch and the temperature at or around the switch. If, for example, the temperature of the switch is no more than a predetermined value relative to the respective temperature rating, the processing element operates the respective switch in the on mode; however, if the temperature exceeds the predetermined value, the processing element places the respective switch in the off mode. To protect each switch from under temperature conditions, the processing element monitors each switch for such a condition and operates the switch accordingly. For example, when the temperature of the respective solid-state switch is no less than the predetermined value, the processing element operates the respective switch in the on mode. But, when the temperature is below the predetermined value, the processing element places the switch in the off mode.

The present invention therefore provides a programmable controller capable of interfacing with a remote master controller, where the programmable controller is capable of controlling the input current to at least one load. The programmable controller provides several advantages over conventional circuit breakers and relays by employing a solid-state switch and a processing element. By including solid-state switches, the programmable controller eliminates the problematic mechanical contacts of conventional circuit breakers and relays. By using a processing element, the programmable controller provides flexibility in power control not available in conventional circuit breakers or relays. The programmable controller can concurrently measure and monitor the loads and switches for the current through the loads and/or switches, the voltage drop across the loads and/or the temperature of the switches. Using a processing element, and by placing it near the loads, allows the programmable controller to reduce the amount of cabling required for power systems employing the present invention which, in turn, reduces parasitic impedance in the cabling and weight of the system. Also, the processing element allows the programmable controller of the present invention to overcome the material limitations of conventional circuit breakers and relays, and operate multiple, different types of loads.

BRIEF DESCRIPTION OF THE DRAWINGS

Figure 1:
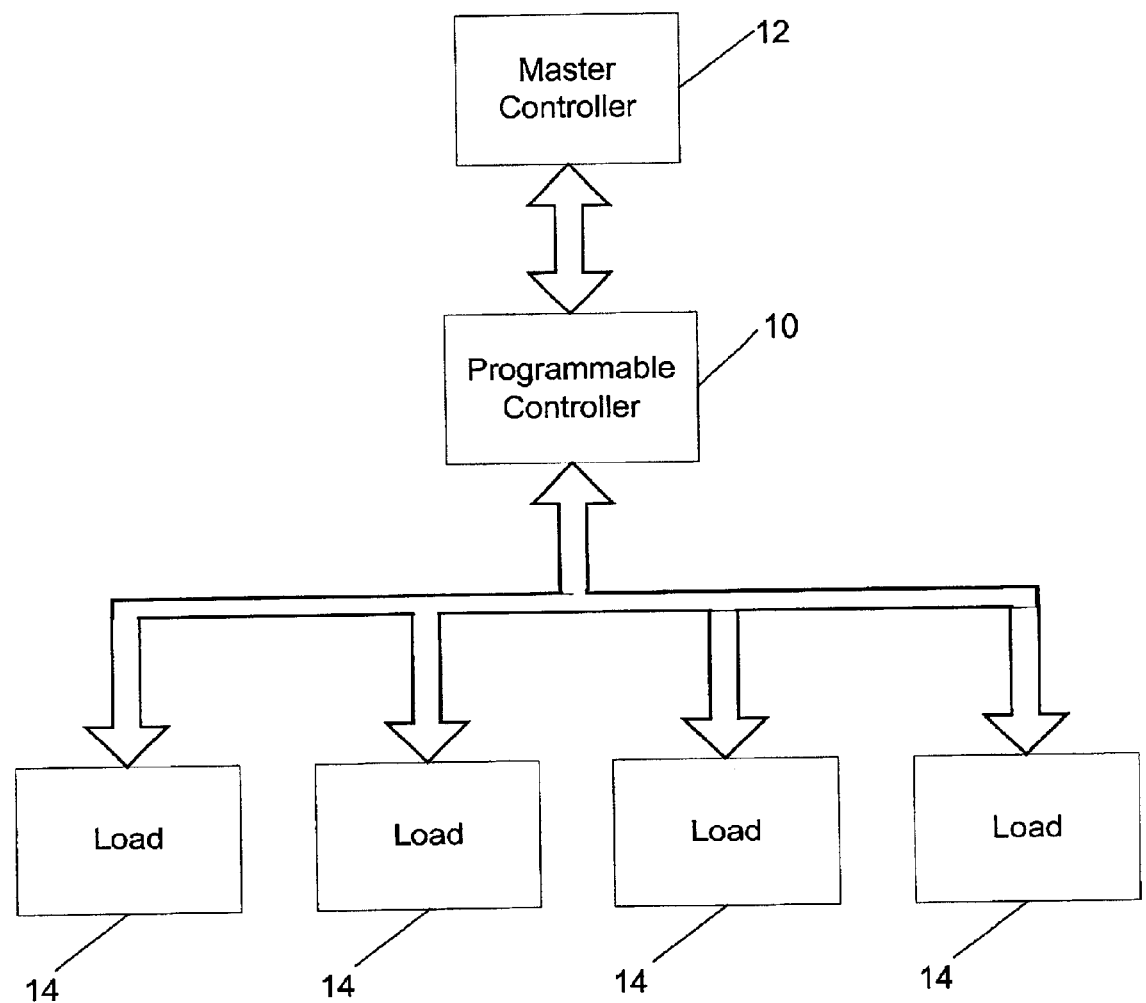
Figure 2:
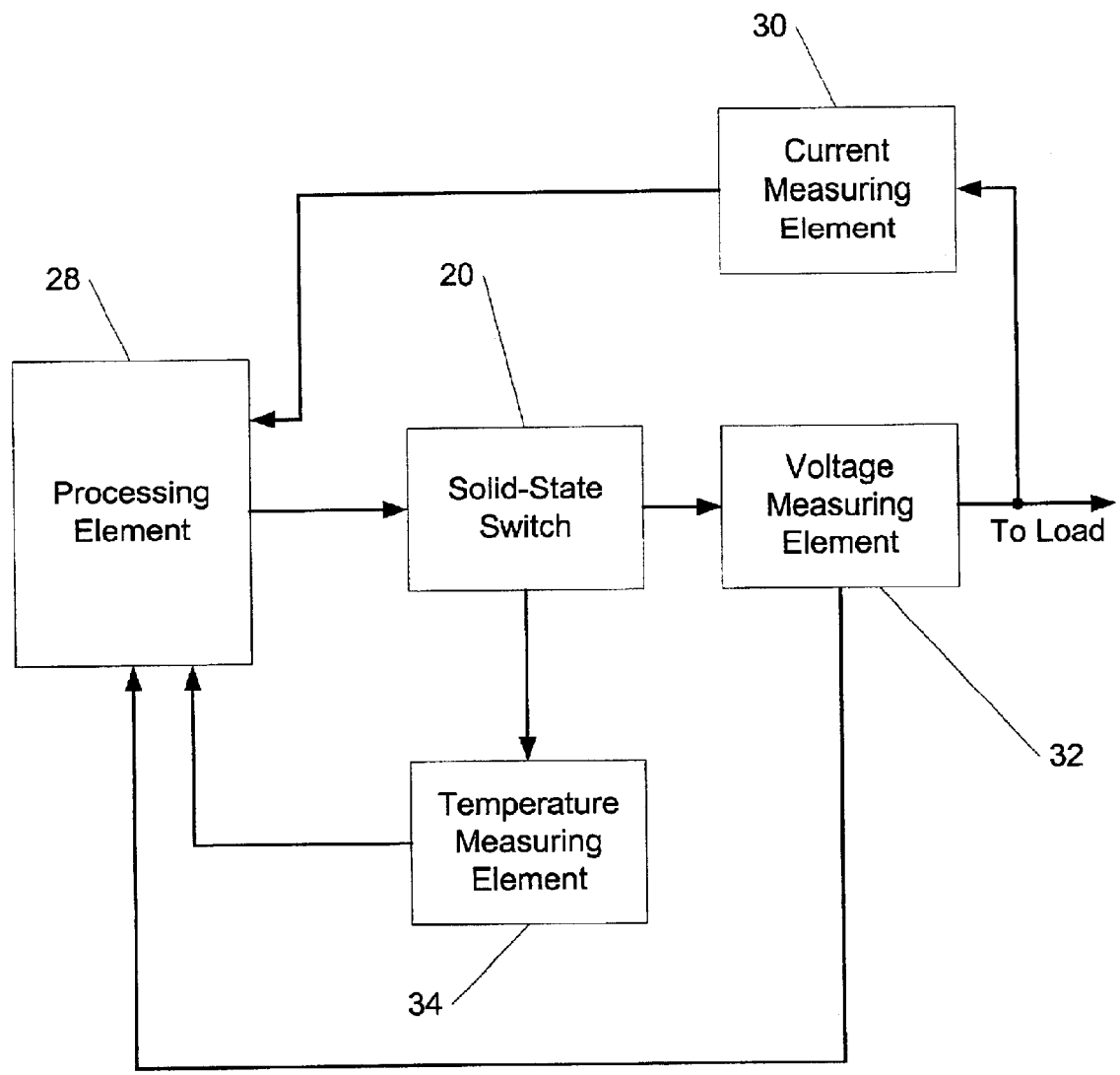
Figure 3:
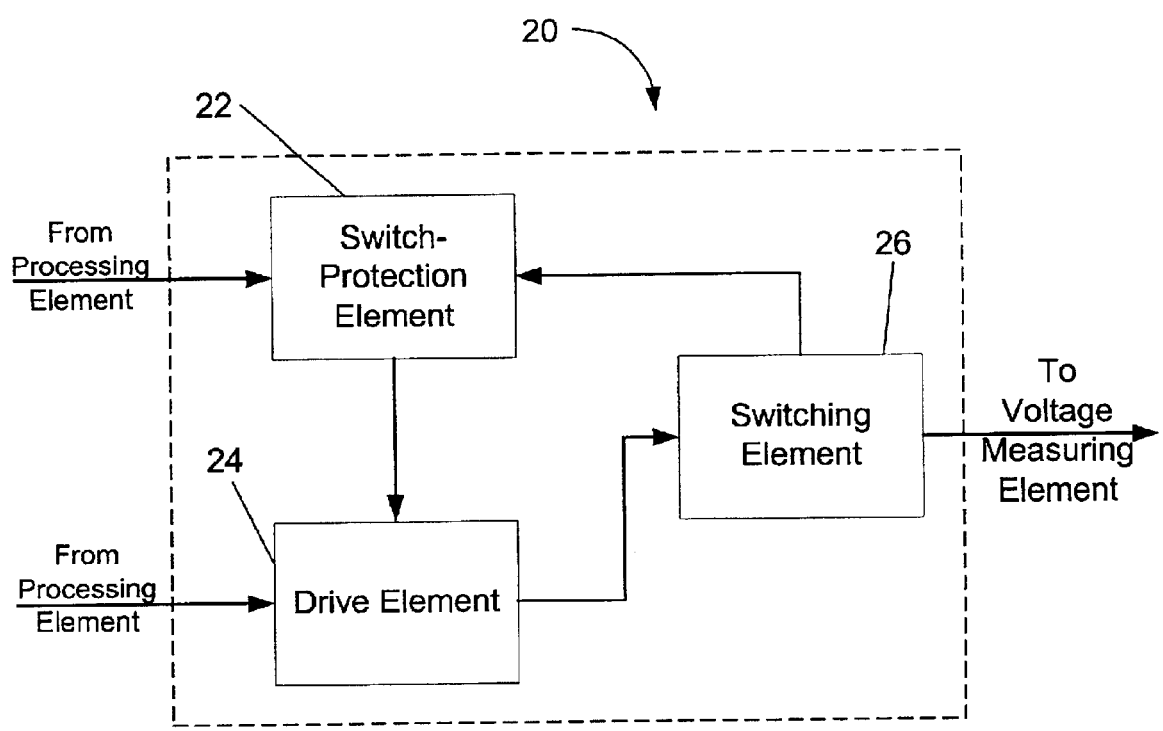
Figure 4:
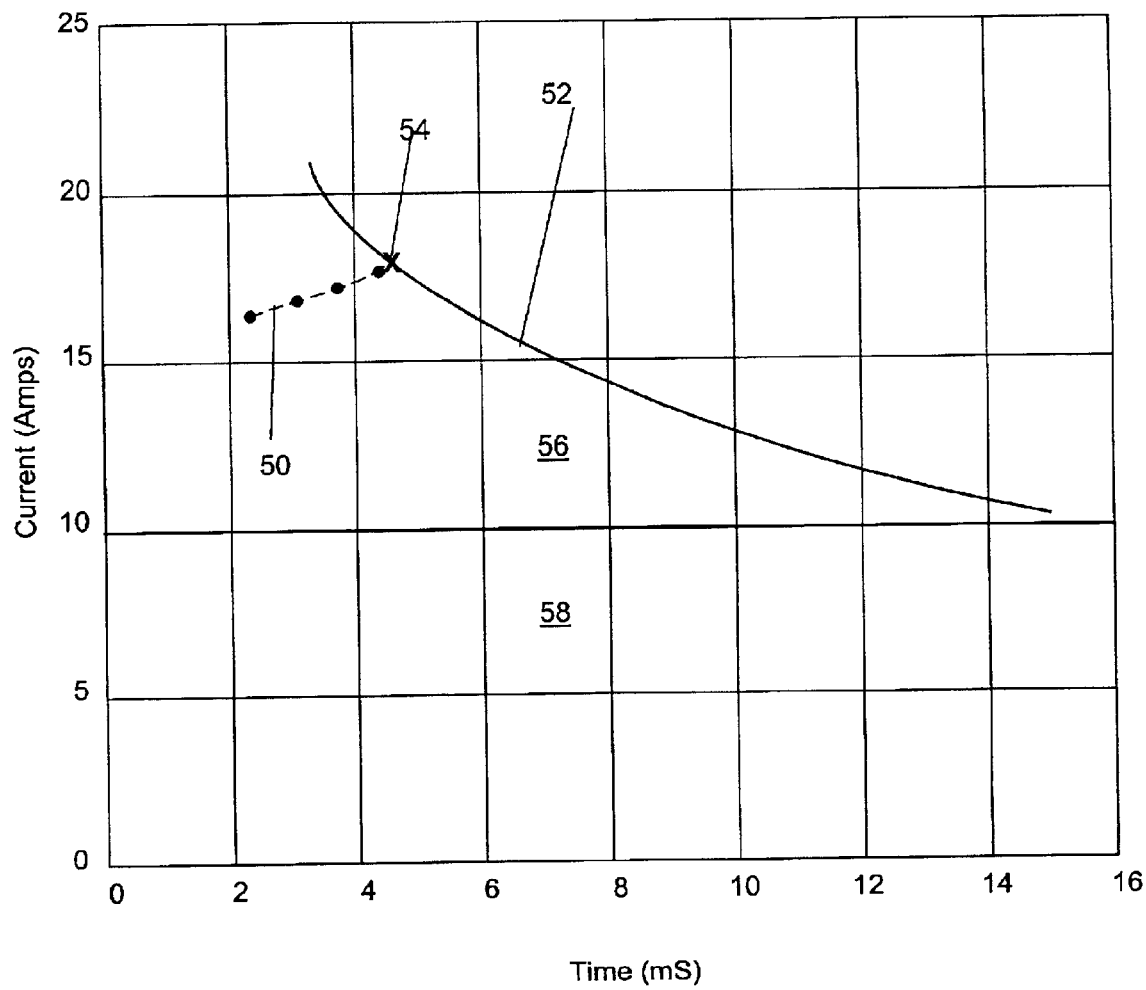
Figure 5:
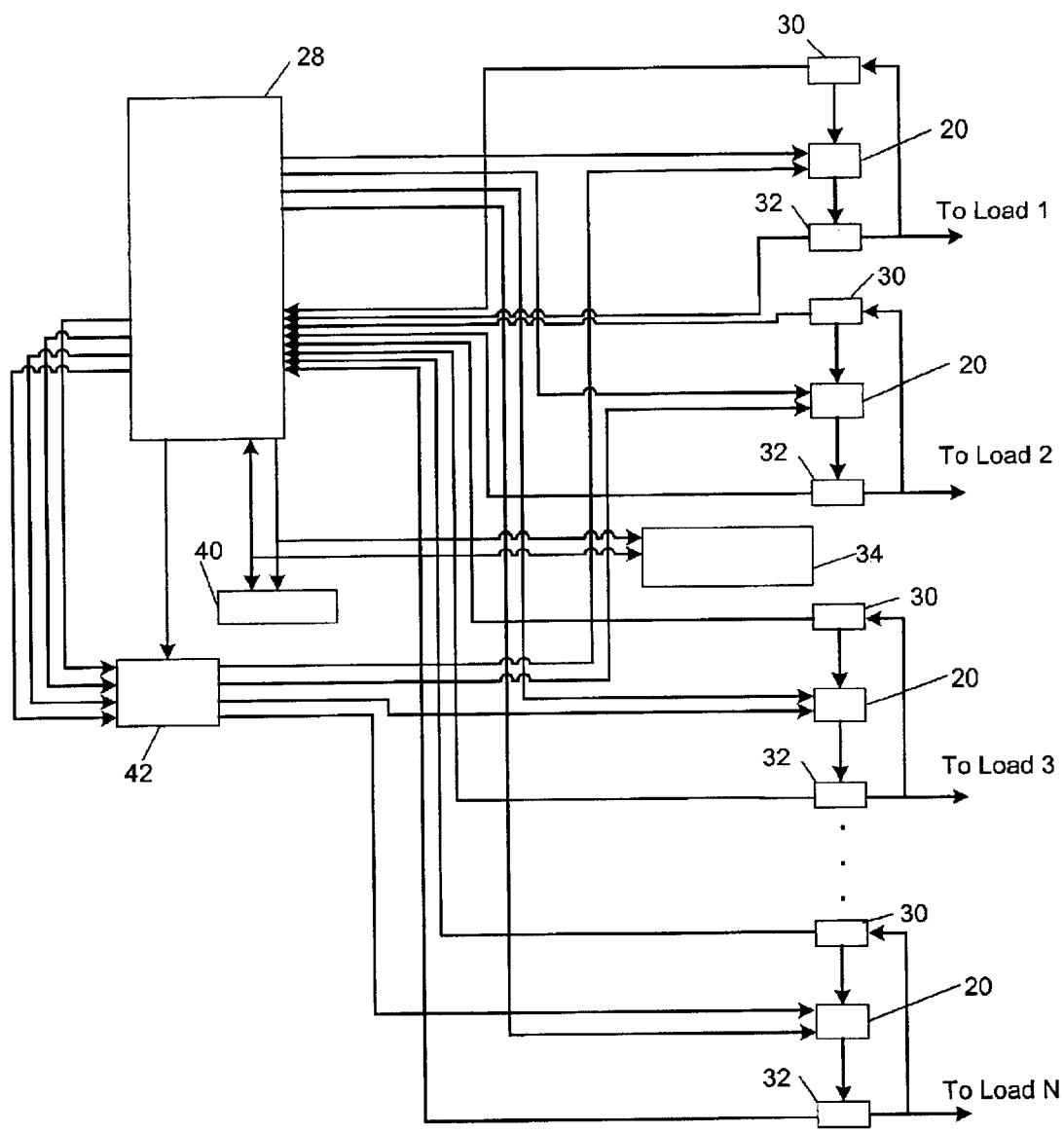
Figure 6:
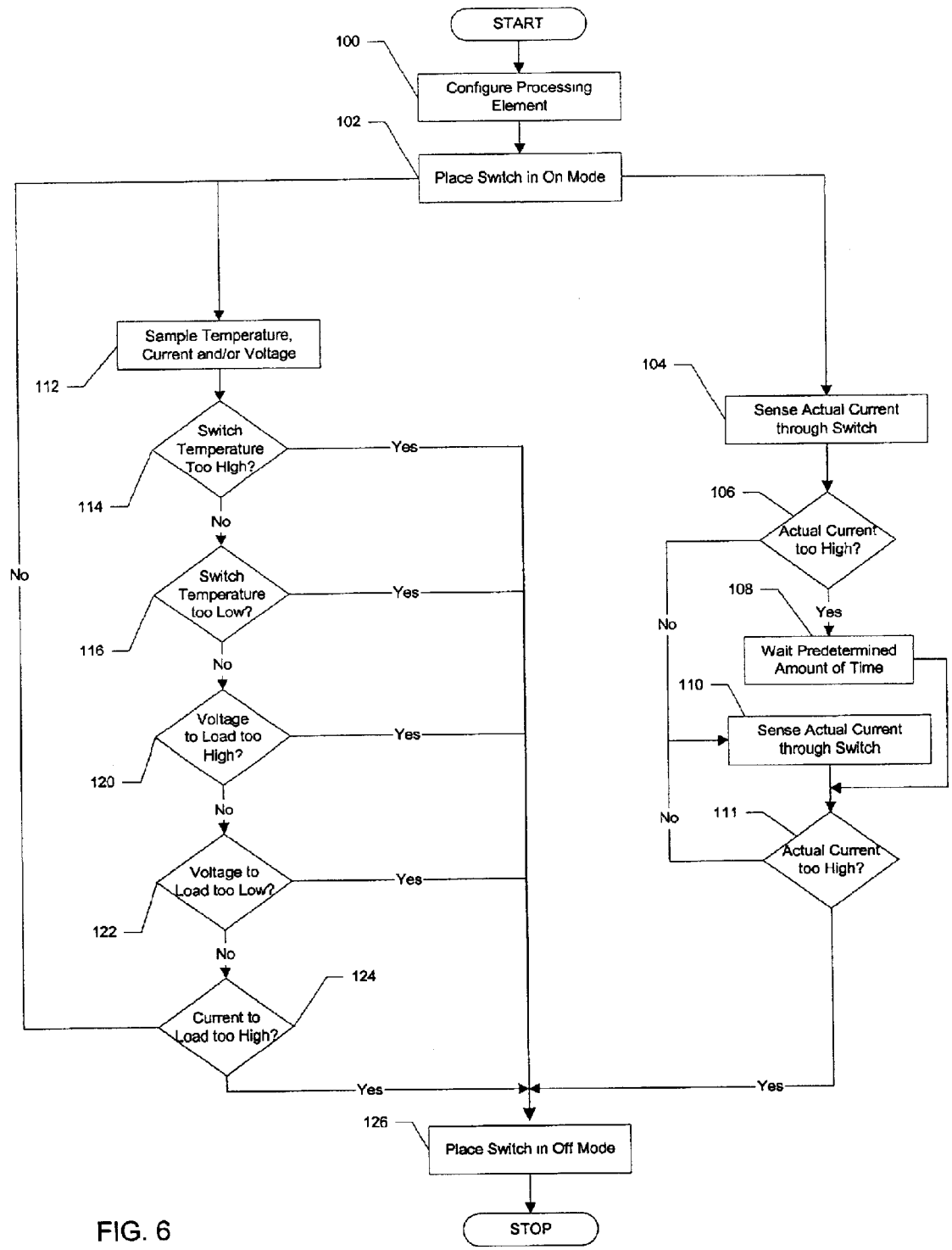
Figure 7:
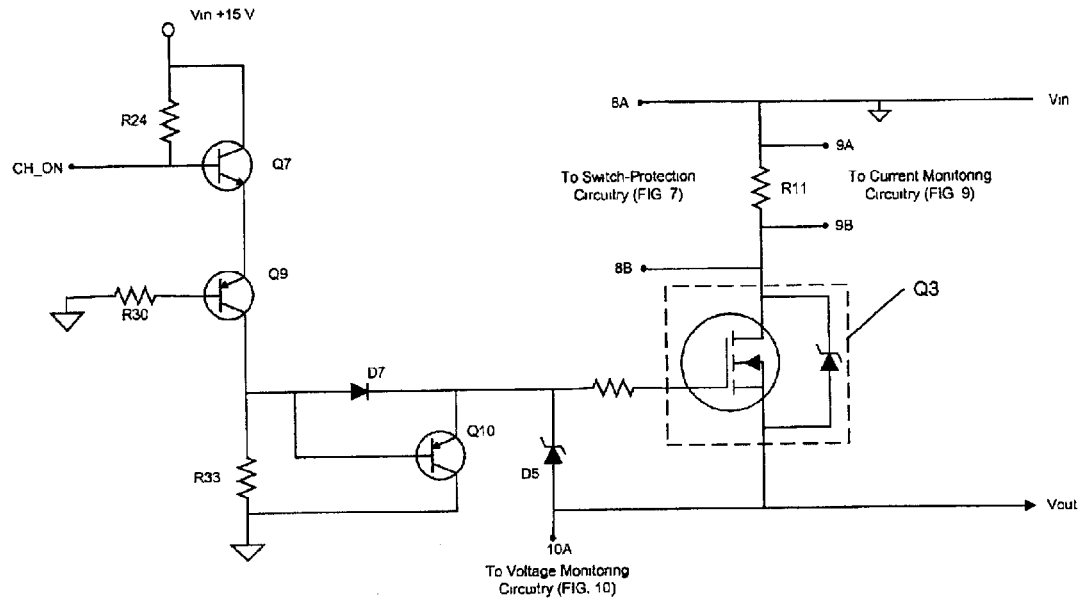
Figure 8:
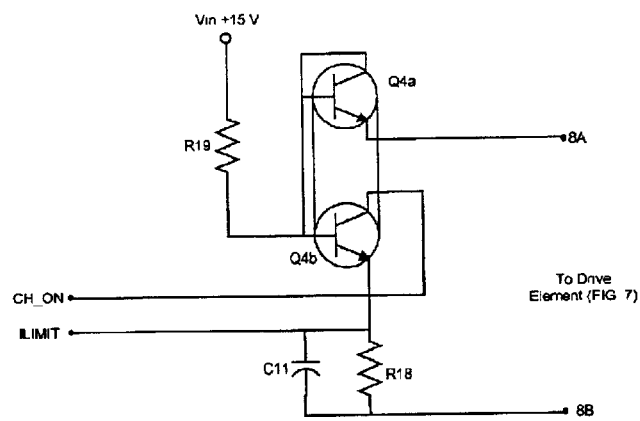
Figure 9:
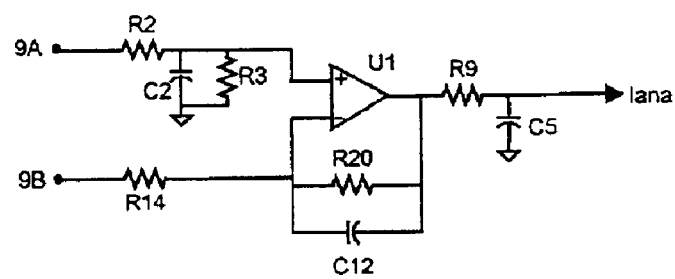
Figure 10:
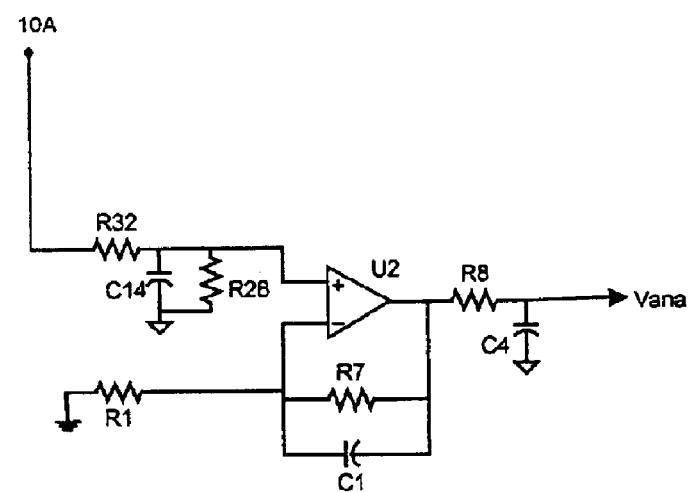

Having thus described the invention in general terms, reference will now be made to the accompanying drawings, which are not necessarily drawn to scale, and wherein:

FIG. 1 is a block diagram of a system of remotely controlling at least one load according to one embodiment of the present invention;

FIG. 2 is a block diagram of a programmable controller including a single solid-state switch and multiple measuring devices according to one embodiment;

FIG. 3 is a block diagram of a solid-state switch according to one embodiment of the present invention;

FIG. 4 is a graph illustrating a characteristic trip curve for a respective load and several current parameter measurements for the respective load;

FIG. 5 is a schematic diagram of one embodiment of a programmable controller of the present invention including multiple solid-state switches and measuring devices;

FIG. 6 is a flow diagram of a method of remotely controlling an input current from a master controller through at least one switch to at least one load according to one embodiment; illustrating the method with respect to one respective switch and load, although the master controller can, and preferably does, control the input current to multiple loads through multiple switches;

FIG. 7 is a schematic circuit diagram illustrating an example configuration of the switching element and drive element of the solid-state switch according to one embodiment of the present invention;

FIG. 8 is a schematic circuit diagram illustrating an example configuration of the switch-protection element, connected across nodes 8A and 8B of the example configuration illustrated in FIG. 7;

FIG. 9 is a schematic circuit diagram illustrating an example configuration of the current measuring element connected across nodes 9A and 9B of the example configuration illustrated in FIG. 7; and FIG. 10 is a schematic circuit diagram illustrating an example configuration of the voltage measuring element connected to node 10A of the example configuration illustrated in FIG. 7.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 is an illustration of one embodiment of the implementation of the programmable controller of the present invention. This illustration is provided so that a more complete understanding of the present invention may be appreciated. It must be understood that the present invention is not limited to this configuration and may be embodied in many different power systems.

With regard to FIG. 1, a general embodiment of a power system in which the present invention is used is shown. The system, typically used to power devices onboard airplanes and automobiles, includes a programmable controller (i.e., slave controller) 10 disposed proximate and electrically connected to at least one load 14, such as one or more electrical components, systems and/or subsystems. For example, the programmable controller can be used to drive electric motors and servos, therefore replacing high maintenance hydraulic devices. By using one programmable controller to control multiple loads, and by disposing the controller proximate the loads as opposed to in one central, humanly accessible location, cabling in the system is reduced which, in turn, reduces parasitic impedance in the system, and reduces the weight of the system. The programmable controller can be electrically connected to a remote master controller 12, such as a high-level processor or computer, which controls the input current to the loads through the programmable controller. Although the programmable controller can be electrically connected to the master controller, the programmable controller can additionally, or alternatively, be configured to operate independent of the master controller or any other type of controller. The programmable controller and the remote master controller can each draw power from a variety of sources as such are known to those skilled in the art. For example, in devices such as airplanes and automobiles, the programmable controller and remote master controller, in addition to the loads, can draw power from the device's existing power bus. Additionally, or alternatively, the programmable controller and/or master controller can be connected to a stand-alone power source that supplies power to the programmable controller and/or master controller. The master controller of the system can additionally be connected to various other electrical systems within various devices. For example, in the automotive industry, the master controller can interface with the vehicle management system and carry out the vehicle management system instructions to the loads in an autonomous fashion. It should be understood that, although the system illustrated depicts one programmable controller electrically connected to one master controller, a single master controller can be, and preferably is, electrically connected to multiple remote programmable controllers without departing from the spirit and scope of the present invention.

As previously mentioned, the master controller 12 controls the input current to the loads 14 through the programmable controller 10. As such, the programmable controller can be used as a power relay or a circuit breaker, depending upon the desired application and the types of loads connected. As discussed below with reference to the programmable controller controlling the loads, the master controller controls the programmable controller by continuously monitoring the programmable controller, controlling the output current from the programmable controller to the loads such as in on and off modes, selecting the various system parameters such as current, voltage and temperature limits, and programming the various system parameters into the programmable controller. Alternatively, or additionally, the programmable controller can be preprogrammed before integration into a device and run free from control from the master controller. Therefore, throughout the description of the present invention, reference will only be made to the programmable controller. But it should be understood that the control features of the programmable controller can be performed by the master controller and/or the programmable controller.

Referring now to FIG. 2, the programmable controller 10 of the present invention includes a processing element 28. The processing element can be any of a variety of processors, such as, for example, the PIC17C752 microcontroller manufactured by Microchip Technology Inc. The processing element monitors and controls the functions of at least one, and preferably multiple, solid-state switches 20, discussed below. Not only does the processing element monitor and control the functions of the switches, the processing element also determines a condition of the switches and/or loads by performing calculations in the firmware using preconfigured characteristics and measured parameters of the switches and/or loads. The processing element allows the programmable controller to provide flexibility to the power system of the present invention not available with conventional circuit breakers or relays. By emulating the material limitations of conventional circuit breakers and relays with firmware, the processing element of the programmable controller overcomes the material limitations of conventional circuit breakers and relays, by having the capability to reprogram the processing element for different loads, as opposed to changing discrete components (i.e., conventional circuit breakers and relays). Also, the programmable controller allows for a wide variety of power control implementations to be programmed and made selectable by the system, such as various trip-curve implementations. In addition, the processing element can caution an operator if a dangerous condition is encountered, or the processing element can automatically control the respective switch accordingly.

The programmable controller 10 also includes at least one, and preferably more than one, solid-state switch 20, each connected to a respective load 14. While the illustration of FIG. 2 depicts only a single solid-state switch, it should be understood that the figure is for illustrative purposes only, and should not be taken to limit the scope of the present invention. In one embodiment, illustrated in FIG. 3, each solid-state switch includes a switching element 26, a drive element 24 and a switch-protection element 22. While the switching element can comprise any number of different solid-state switches, such as a MOSFET or an IGBT. The switching element acts to alter the input current to the respective load, typically operating in either an on mode wherein the switching element permits the respective load to receive the input current, or an off mode wherein the switching element prevents the respective load from receiving the input current. As previously stated, a solid-state switch eliminates the mechanical contacts of conventional circuit breakers and relays which, in turn, eliminates the erosion and other problems associated with mechanical contacts.

The solid-state switch 20 also includes a drive element 24 that provides the input current to the switching element 26, and typically comprises circuitry consisting of conventional electrical components such as resistors, diodes and transistors. Additionally, the solid-state switch may include a switch-protection element 22 that protects the switching element against instantaneous over-current conditions that could damage the switching element. The switch-protection element can comprise any of a number of different configurations, but, like the drive element, typically comprises conventional electrical components such as diodes, transistors, resistors and capacitors.

In operation, the switch-protection element 22 senses an actual current through the switching element 26. If the actual current is above a predetermined value, such as a maximum current rating of the switching element, the switch-protection element alters the actual current through the switching element so that the actual current is no more than the predetermined value, typically placing the switching element in the off mode. In some instances when the solid-state switch 20 is initialized at start-up, an inrush of actual current flows through the switching element. But while this current may be above the predetermined value, it typically settles down to a level at or below the predetermined value within a fairly short time. To account for this inrush of current and prevent the switch-protection element from prematurely altering the input current, the switch-protection element of one embodiment is capable of waiting a predetermined amount of time before monitoring the level of current through the switching element. This predetermined amount of time allows the level of current to settle to a more constant, operation level before the switch-protection element monitors the switching element for instantaneous over-current situations. Additionally, or alternatively, the switch-protection element can be configured to control the actual current in different manners at different times or in different modes of operation. For example, the switch-protection element can be configured to step down the predetermined value at which current is interrupted from an initial, elevated value to a stable, constant value at the conclusion of the predetermined amount of time.

Referring again to FIG. 2, the programmable controller 10 of the present invention includes at least one, and preferably more than one, measuring element that measures various conditions of the loads 14 and solid-state switches 20. For example, the programmable controller may include a current measuring element 30 and/or a voltage measuring element 32 that measure the input current through and voltage drop across a respective load. Additionally, the programmable controller may include a temperature measuring element 34 that measures the temperature at or around the solid-state switch. The current and voltage measuring elements are typically made from conventional electrical components such as resistors, capacitors and operational amplifiers. Also, the temperature measuring device can be made from any number of devices, such as the LM75 digital temperature sensor, manufactured by National Semiconductor. In operation, the measuring elements protect the loads 14 and/or solid-state switches 20 from undesirable conditions such as over-current, over and under voltage, and over and under temperature conditions by comparing such measured parameters against predetermined values for the respective load and/or switch. For example, the predetermined value for each load may be based upon material characteristics of the load, such as a maximum current or voltage rating, or a minimum operational voltage. Also, for example, the predetermined temperature value for each solid-state switch may comprise a maximum temperature rating for the respective solid-state switch, over which causes damage to the solid-state switch. Additionally, the predetermined value based upon current or voltage rating characteristics can additionally take into account the predetermined temperature value because the current and voltage characteristics of various loads typically change over a range of temperatures.

Referring to FIG. 4, typically, the processing element 28 compares the measured parameters against the predetermined values by first constructing a model trip curve 50 comprising a plurality of measured parameter values at different points in time. The processing element compares the model trip curve against a characteristic trip curve 52 for the respective load and/or switch. The characteristic trip curve is typically predefined based on a characteristic of the switch and/or load associated with the particular parameter, such as a current rating characteristic trip curve associated with the measured input current through the switch and/or to the load. FIG. 4 illustrates a characteristic trip curve along with a constructed model trip curve for a switch and/or a load with a ten amp current rating. Although not illustrated, the characteristic trip curve can additionally be predefined based upon a combination of the various parameters associated with the switch and/or load, such as the temperature of the switch and/or load along with another parameter of the switch and/or load since many parameters of the switch and/or load may vary depending on the temperature of the switch and/or load. The characteristic trip curve is stored by the processing element or an associated memory device 40 (illustrated in FIG. 5 and discussed below), thus making any trip curve implementation possible, such as $I^2T$ and tiered. The predetermined values of the characteristic trip curve are defined to prevent the solid-state switch and/or load from operating too long in a dangerous area 56. By referencing the characteristic trip curve, the processing element can keep the measured parameter in a safe area 58, such as below the current rating of the switch and/or the load, and turn off the switch before the switch and/or load can be damaged by crossing a critical point 54 on the characteristic trip curve. If the condition measured by the respective measuring element falls outside the range of predetermined values or above the predetermined value or, more typically, if the model trip curve constructed by the processing element based upon the measured parameter or parameters is predicted to reach the critical point on the characteristic trip curve the processing element alters the input current through the solid-state switch accordingly. For example, if the processing element in conjunction with the measuring element determine that the input current to the load will remain at or above a certain level for more than the maximum time permitted by the characteristic trip curve within a predefined period of time, the processing element can alter the input current to bring the measured value within the predetermined value range or below the predetermined value or, preferably, the processing element can place the solid-state switch in the on or off mode.

In another advantageous embodiment, when the input current to the switch and/or the load reaches or exceeds a certain level, such as a maximum current rating or an input current rating, respectively, the processing element repeatedly increases a count. If the count exceeds a predetermined threshold representative of the predefined period of time, the processing element can alter the input current to reduce the input current to below the certain level, such as by placing the switch in the off mode. But if the input current to the load decreases to below the certain level before the count exceeds the threshold, the processing element will repeatedly decrease the count. In this regard, the processing element can account for previous current stress (e.g., excess current) to the switch and/or the load should the switch and/or the load experience a subsequent current stress before the count reaches zero since the count would begin upward again, although not from zero but from a value representative of the residual stress on the switch and/or the load.

As depicted in FIG. 5, the programmable controller 10 of the present invention preferably includes the processing element 28 electrically connected to multiple solid-state switches 20, with each having a set of current 30 and voltage 32 measuring elements, and with each providing output current to a respective load 14. By placing two solid-state switches near each other, multiple solid-state switches can be used in parallel to double or otherwise increase the output current rating to a single solid-state switch. As illustrated, because of the proximity of the components of the programmable controller, and the slight drop of solid-state switch temperature across the area of the programmable controller, the programmable controller can include a single temperature measuring element 34 disposed near multiple solid-state switches. It should be understood, however, that multiple temperature measuring elements can be included, with each able to measure the temperature of a respective solid-state switch without departing from the spirit and scope of the present invention.

Although not illustrated, the outputs from the measuring elements typically produce an analog signal for input to the processing element 28. Depending upon the type of processing element used, the programmable controller 10 may additionally include one or more analog-to-digital (A/D) converters to convert the analog signals from the measuring elements to digital signals for input to the processing element. The programmable controller may also include a monitoring element 42. The processing element continually pulses the monitoring element to ensure proper performance of the programmable controller. In the event the processing element fails to function properly by failing to control the input current, such as when the firmware loop locks up or the processing element fails, the monitoring element takes control of the switches 20 to alter the input current to a predefined level. For example, the monitoring element can place the switches in the off mode and prevent them from operating in the on mode until commanded. Also, for example, the monitoring element can control the switches in either an on mode or otherwise alter the input current to another predefined level. In addition to the monitoring element, the programmable controller may also include one or more memory devices 40, such as EEPROMs, for nonvolatile storage and/or program memory. The nonvolatile storage can be used to store initial state information for the processing element, switches and/or the loads, such as the characteristic trip curves for the various switches and/or loads. Additionally, the nonvolatile storage can be used to store status signals for the switches and/or loads for later use by the programmable controller or later transferring to the master controller 12.

Referring now to FIG. 6, a method of remotely controlling the input current from the processing element 28 through each switch 20 to each load 14, according to one embodiment of the present invention, begins by configuring the firmware of the processing element based upon the desired characteristics of the switches and loads, such as current and voltage ratings of each load, a maximum current rating of each switch and/or a temperature rating of each switch (block 100). For example, the firmware can be configured with the characteristic trip curves typically predefined based upon the characteristics of the switch and/or load. Additionally, the characteristic trip curves can be predefined based upon a combination of the various characteristics of the switch and/or load, such as the temperature of the switch and/or load along with another parameter of the switch and/or load since many parameters of the switch and/or load may vary depending on the temperature of the switch and/or load. Thus, different characteristic trip curves can be utilized depending upon the temperature of the switch. Additionally, or alternatively, the characteristics of each switch related to current through the switch, such as the maximum current rating, can be configured into the respective switch-protection element 22 to monitor the actual current through the respective switch. Advantageously, by configuring the processing element with the characteristics of the switches and loads, if a switch or load with different characteristics is connected to the power system, the processing element can be reconfigured such as by constructing and storing the characteristic trip curves associated with the different switch or load, as opposed to replacing the discrete components of conventional circuit breakers and relays.

After the processing element 28 has been configured, each switch 20 is operated in the on mode, as desired, to provide the input current to the respective load 14 (block 102). As the switch is operating in the on mode, the switch-protection element senses the actual current through the switch (block 104). If the actual current is above a predetermined value, such as the maximum current rating of the switch, the switch-protection element can wait a predetermined amount of time to allow any inrush of current to settle to a stable level (blocks 106 and 108). Additionally, or alternatively, the switch-protection element can be configured to control the actual current at different times or in different modes of operation. For example, the switch-protection element and/or processing element can be configured to step down the predetermined value from an initial, elevated value to a stable value at the conclusion of the predetermined amount of time. If, after the predetermined amount of time the actual current is still above the predetermined value, the switch-protection element reduces the actual current, such as by placing the switch in the off mode (blocks 111 and 126). In the event the actual current is below the predetermined value, either initially or after the predetermined period of time, the switch-protection element continuously monitors the actual current to ensure the actual current remains below the predetermined value (blocks 110 and 111).

As the switch-protection element 22 monitors the switch 20 for an over-current situation, the processing element 28 periodically samples the current and/or voltage through and/or across the load 14, and/or samples the temperature of or around the switch to use to obtain a condition of the load and/or switch (block 112). The condition is then determined by comparing the current, voltage and/or temperature against the characteristics predefined by the processing element.

The processing element can determine if an over temperature (block 114) or under temperature (block 116) condition exists in the switch. And if so, the processing element can alter the input current accordingly. For example, the temperature measuring element can measure the air temperature at or around the switch and compare the measured temperature against the predetermined values for the desired temperature range, such as critical temperature limits. If the measured temperature is below or above the desired temperature range, the processing element can place the respective switch in the off mode to prevent the switch from being damaged or from damaging the respective load (block 126). Alternatively, the processing element can construct different characteristic trip curves based upon other parameters to emulate the temperature at or around the switch based upon characteristics of the switch that vary in proportion to the temperature of the switch.

The processing element can also determine if an over voltage (block 120) or under voltage (block 122) condition exists in the load 14 and alter the input current accordingly. For example, if the measured voltage drop across a respective load falls outside the preconfigured voltage range for the respective load, the processing element 28 can alter the input current to place the voltage drop within the desired levels or place the respective switch 20 in the off mode.

The processing element 28 can also determine if an over current condition (block 124) exists in the load 14 and, if so, alter the input current to below the predetermined level. For example, the processing element can determine a model trip curve 50 using a plurality of measured parameter values at different points in time. The processing element compares the model trip curve against the characteristic trip curve 52 for the respective load and/or switch 20. The predetermined values in the characteristic trip curve are defined to prevent the switch from operating too long in the dangerous area 56. Additionally, the processing element can account for previous current stresses (e.g., previous switch operations in the dangerous area) by maintaining a count. As the switch operates in the dangerous area, the processing element repeatedly increases the count. And if the switch returns to operating outside of the dangerous area before the count reaches a predetermined threshold (representative of the maximum amount of time the switch is allowed to operate in the dangerous area), the processing element can repeatedly decrease the count as long as the switch remains outside the dangerous area, as previously described. By referencing the characteristic trip curve, the processing element can turn off the switch before the switch and/or load can be damaged, such as by placing the switch in the off mode (block 126).

FIGS. 7, 8, 9 and 10 illustrate example configurations for the solid-state switch 20 including the drive element 24 and switching element 26 (FIG. 7), and switch-protection element 22 (FIG. 8), the current measuring element 30 (FIG. 9) and the voltage measuring element 32 (FIG. 10). FIG. 7 illustrates an example arrangement of conventional electrical components comprising the drive and switching elements of the solid-state switch. The switching element illustrated is a high-side N-channel MOSFET Q3 that acts as a source follower with its source, being the switching element output, following its gate. The drive element consists of a pull-up drive and a pull-down drive. The pull-up drive comes from two transistors, Q7 and Q9. In the illustrated example, Q7 is a follower-connected NPN transistor, driven by an output CH_ON from the processing element 28. The other transistor Q9 is a high-voltage rated, common base PNP transistor across which all of the voltage swing from the NPN transistor Q7 appears. The output of the PNP transistor Q9 is connected to the gate of the MOSFET Q3. The pull-down drive consists of another PNP transistor Q10 that pulls down the output voltage, discharges the load and holds the load voltage low. Diode D7 prevents any current from flowing back through portions of the pull-up drive and insures that PNP transistor Q10 will not turn on while the MOSFET Q3 is in the on mode.

FIG. 8 illustrates an example configuration of the switch-protection element 22, which connects to nodes 8A and 8B of the drive 24 and switching 26 elements illustrated in FIG. 7. The switch-protection element uses a base-to-emitter type sensing from a sense NPN transistor Q4*b* across a resistor R11 (illustrated in FIG. 7). Another NPN transistor Q4*a* is connected as a diode and is a matched pair transistor with sense transistor Q4*b*. Using a matched pair transistor connected as a diode offsets the base-to-emitter drop across the sense transistor Q4*b* and allows the use of a low value resistor R11. The processing element 28 sends a current ILIMIT through a R2R resistor ladder network comprising capacitor C11 and resistor R18 that, along with the R2R network, generate a constant voltage that is proportional to the predetermined current value compared to the actual current measured by the current-protection element. Additionally, the RC constant of the R2R network is used to determine the predetermined time the switch-protection element will wait, or step down the predetermined current value, to allow for any inrush of current when the switching element starts in the on mode.

As shown in FIG. 9, one example of the current measuring element 30 connects to nodes 9A and 9B of the drive 24 and switching 26 elements illustrated in FIG. 7. The current measuring element includes a differential operational amplifier U1 that senses the current level across the resistor R11 for input to the processing element 28 as a current measurement Iana. Advantageously, this configuration provides a very accurate current measurement even for high voltages. This is because the resistor R11 is connected in series with the high side of the source voltage Vin and, since the power supplies of the differential amplifier U1 and the processing element are referenced to the high side, there is no common-mode voltage that might affect the differential amplifier U1. The various resistors and capacitors provide signal conditioning and filtering for the current measurement as it enters and exits the differential amplifier, such as are known to those skilled in the art.

FIG. 10 illustrates one example of the voltage measuring element 33, which connects to node 10A of the drive 24 and switching 26 elements illustrated in FIG. 7. The voltage measuring element includes a differential operational amplifier U2 that senses the voltage drop applied across the load 14 for input to the processing element 28 as a voltage measurement Vana. Like with the example current measuring element 30 illustrated in FIG. 9, the various resistors and capacitors shown in FIG. 10 provide signal conditioning and filtering for the voltage measurement as it enters and exits the differential amplifier, such as are known to those skilled in the art.

Therefore, the device, system and method of the present invention provide a programmable controller capable of interfacing with a remote master controller, where the programmable controller is capable of controlling the input current to at least one load. The programmable controller includes at least one solid-state switch to, therefore, eliminate the problematic mechanical contacts of conventional circuit breakers and relays. Also, the programmable controller includes a processing element to thereby add flexibility in power control not available in conventional circuit breakers or relays. The programmable controller can concurrently measure and monitor the loads and switches for the current through the loads and/or switches, the voltage drop across the loads and/or the temperature of the switches. Using a processing element, and by placing it near the loads, the programmable controller is capable of reducing the amount of cabling required for power systems. By reducing the amount of cabling, the present invention reduces parasitic impedance in the cabling and weight of the system. Also, by employing a processing element, the programmable controller is readily reconfigurable and, thus, capable of overcoming the material limitations of conventional circuit breakers and relays, and operate multiple, different types of loads.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A programmable controller capable of interfacing with a remote master controller, wherein said progammable controller is capable of controlling an input current to at least one load, said programmable controller comprising:

at least one solid-state switch capable of controllably altering the input current to the at least one load, wherein each said solid-state switch comprises:

a switching element electrically connected to the at least one load, wherein said switching element is capable of altering the input current to the at least one load; and a drive element for providing the input current to the at least one load, wherein said switching element controls the input current provided by said drive element to said at least one load;

at least one measuring element for measuring at least one parameter associated with the at least one load and said at least one solid-state switch; and a processing element disposed proximate the at least one load, and electrically connected to said at least one solid-state switch and said at least one measuring element, wherein said processing element is capable of controlling said at least one solid-state switch according to the at least one parameter.

2. A programmable controller according to claim 1, wherein said switching element has a maximum current rating, and wherein each solid-state switch further comprises a switch-protection element electrically connected to said switching element and said drive element, wherein said switch-protection element is capable of sensing an actual current through said switching element and controlling the input current to the at least one load depending upon the actual current and the maximum current rating.

3. A programmable controller according to claim 2, wherein said switch-protection element is capable of controlling said drive element to provide the input current to a respective load such that the actual current through said switching element is no more than the maximum current rating.

4. A programmable controller according to claim 2, wherein when the actual current through said switching element exceeds the maximum current rating for more than a predefined period of time, said switch-protection element controls said drive element to thereby reduce the actual current through said switching element to no more than the maximum current rating.

5. A programmable controller according to claim 1, wherein said at least one measuring element is capable of measuring a voltage drop across a respective load, and wherein said processing element is capable of controlling said at least one solid-state switch according to the voltage drop across the respective load.

6. A programmable controller according to claim 1, wherein said at least one measuring element is capable of measuring a current through a respective load, and wherein said processing element is capable of controlling said at least one solid-state switch according to the current through the respective load.

7. A programmable controller according to claim 1, wherein said at least one measuring element is capable of measuring a temperature of said at least one solid-state switch, and wherein said processing element is capable of controlling said at least one solid-state switch according to the temperature of a respective solid-state switch.

8. A programmable controller according to claim 7 further comprising a memory device electrically connected to said processing element.

9. A programmable controller according to claim 1 further comprising a monitoring element electrically connected to said processing element and said at least one solid-state switch, wherein when said processing element fails to function properly by failing to control said at least one solid-state switch, said monitoring element is capable of controlling said solid-state switch to alter the input current to a predefined level.

10. A programmable controller according to claim 1, wherein said at least one solid-state switch operates in at least one mode selected from a group consisting of an on mode wherein said at least one solid-state switch permits a respective load to receive the input current, and an off mode wherein said at least one solid-state switch prevents the respective load from receiving the input current, and wherein said processing element controls the mode depending upon the at least one parameter.

11. A programmable controller according to claim 10, wherein each load has an input current rating, and wherein said processing element controls the mode of said at least on solid-state switch depending upon the input current and input current rating of a respective load.

12. A programmable controller according to claim 11, wherein when the input current to a respective load is no more than the input current rating of the load said processing element operates the respective solid-state switch in the on mode, and wherein when the input current to the load exceeds the input current rating the processing element places the respective solid-state switch in the off mode.

13. A programmable controller according to claim 11, wherein said processing element controls the mode of said at least one solid-state switch depending upon the input current, the input current rating of a respective load and an amount of time the load has received the input current.

14. A programmable controller according to claim 13, wherein when the input current to a respective load is no more than the input current rating of the load said processing element operates the respective solid-state switch in the on mode, and wherein when the input current to the load exceeds the input current rating for more than a predefined period of time the processing element places the respective solid-state switch in the off mode.

15. A programmable controller according to claim 14, wherein when the input current to a respective load exceeds the input current rating, said processing element repeatedly increases a count associated with an elapsed time until at least one occurrence selected from a group consisting of the input current reduces to no more than the input current rating and the count reaches a predetermined threshold representative of the predefined period of time, wherein when the input current reduces to no mare than the input current rating, the processing element repeatedly decreases the count.

16. A programmable controller according to claim 10, wherein said at least one solid-state switch has a maximum current rating, wherein when the input current through a respective solid-state switch is no more than a respective maximum current rating said processing element operates the respective solid-state switch in the on mode, and wherein when the input current through said solid-state switch exceeds the respective maximum current rating said processing element places the respective solid-state switch in the off mode.

17. A programmable controller according to claim 10, wherein said at least one solid-state switch has a maximum current rating, wherein when the current through a respective solid-state switch exceeds a respective maximum current rating for more than a predefined period of time, said processing element places the respective solid-state switch in the off mode.

18. A programmable controller according to claim 10, wherein said processing element controls the mode of said at least one solid-state switch depending upon a temperature of a respective solid-state switch.

19. A programmable controller according to claim 18, wherein when the temperature of a respective solid-state switch is no more than a predetermined value the processing element operates the respective solid-state switch in the on mode, and wherein when the temperature exceeds the predetermined value the processing element places the respective solid-state switch in the off mode.

20. A programmable controller according to claim 18, wherein when the temperature of a respective solid-state switch is no less than a predetermined value the processing element operates the respective solid-state switch in the on mode, and wherein when the temperature is below the predetermined value the processing element places the respective solid-state switch in the off mode.

21. A programmable controller according to claim 10, wherein said processing element controls the mode of said at least one solid-state switch depending upon a voltage drop across a respective load.

22. A programmable controller according to claim 21, wherein when the voltage drop across a respective load is no more than a predetermined value the processing element operates the respective solid-state switch in the on mode, and wherein when the voltage drop exceeds the predetermined value the processing element places the respective solid-state switch in the off mode.

23. A programmable controller according to claim 21, wherein when the voltage drop across a respective load in no less than a predetermined value the processing element operates the respective solid-state switch in the on mode, and wherein when the voltage drop is below the predetermined value the processing element places the respective solid-state switch in the off mode.

24. A programmable switch controller capable of interfacing with a remote master controller, wherein said switch controller is capable of electrically controlling an input current to at least one load, said switch controller comprising:
   at least one solid-state switch capable of controllably altering the input current to the at least one load, wherein said solid-state switch operates in at least one mode selected from a group consisting of an on mode wherein said solid-state switch permits the at least one load to receive the input current, and an off mode wherein said solid-state switch prevents the at least one load from recieving the input current, and wherein each solid-state switch comprises:
      a switching element electrically connected to the at least one load, wherein said switching element is capable of operating in at least one mode consisting of the on mode and the off mode; and
      a drive element for providing the input current to the at least one load, wherein said switching element controls the input current provided by said drive element to said at least one load;
   at least one measuring element for measuring at least one parameter associate with the at least one load and said at least one solid-state switch; and
   a processing element disposed proximate the at least one load, and electrically connected to said at least one solid-state switch and said at least one measuring element, wherein said processing element is capable of controlling the operating mode of each solid-state switch according to the at least one parameter.

25. A programmable switch controller according to claim 24 further comprising a memory device electrically connected to said processing element.

26. A programmable switch controller according to claim 24 further comprising a monitoring element electrically connected to said processing element and said at least one solid-state switch, wherein when said processing element fails to function properly by failing to control said at least one solid-state switch, said monitoring element is capable of controlling the operating mode of said at least one solid-state switch.

27. A programmable switch controller according to claim 24, wherein said at least one solid-state switch has a maximum current rating, and wherein said programmable switch controller further comprises at least one switch-protection element capable of sensing an actual current through said at least one solid-state switch and controlling the operating mode of the respective solid-state switch depending upon the actual current through the respective solid-state switch a respective maximum current rating.

28. A programmable switch controller according to claim 27 wherein when the actual current through the respective solid-state switch is no more than a respective maximum current rating said switch-protection element operates the respective solid-state switch in the an mode, and wherein when the actual current through the respective solid-state switch exceeds the respective maximum current rating said switch protection element places the respective solid-state switch in the off mode.

29. A programmable switch controller according to claim 27, wherein when the actual current through the respective solid-state switch exceeds a respective maximum current rating for more than a predefined period of time, said switch protection element places the respective solid-state switch in the off mode.

30. A programmable switch controller according to claim 24, wherein said at least one measuring element is capable of measuring a current through a respective load, and wherein said processing element is capable of controlling the operating mode of said at least one solid-state switch according to the current through the respective load.

31. A programmable switch controller according to claim 24, wherein the at least one load has an input current rating, and wherein said processing element controls the mode of said at least one solid-state switch depending upon the input current and input current rating of a respective load.

32. A programmable switch controller according to claim 31, wherein when the input current to the at least one load is no more than the input current rating of a respective load the processing element operates the respective solid-state switch in the on mode, and wherein when the input current to the load exceeds the input current rating the processing element places the respective solid-state switch in the off mode.

33. A programmable switch controller according to claim 31, wherein said processing element controls the mode of said at least one solid-state switch depending upon the input current, the input current rating of a respective load and an amount of time the load has received the input current.

34. A programmable switch controller according to claim 33, wherein when the input current to a respective load is no more than the input current rating of the load said processing element operates the respective solid-state switch in the on mode, and wherein when the input current to the load exceeds the input current rating for more than a predefined period of time the processing element places the respective solid-state switch in the off mode.

35. A programmable switch controller according to claim 34, wherein when the input current to a respective load exceeds the input current rating, said processing element repeatedly increases a count associated with an elapsed time until at least one occurrence selected from a group consisting of the input current reduces to no more than the input current rating and the count reaches a predetermined threshold representative of the predefined period of time, wherein when the input current reduces to no more than the input current rating, the processing element repeatedly decreases the count.

36. A programmable switch controller according to claim 24, wherein said at least one measuring element is capable of measuring a temperature of said at least one solid-state switch, and wherein said processing element is capable of controlling the operating mode of a respective solid-state switch according to the temperature of said solid-state switch.

37. A programmable switch controller according to claim 36, wherein when the temperature of a respective solid-state switch is no more than a predetermined value the processing element operates the respective solid-state switch in the on mode, and wherein when the temperature exceeds the predetermined value the processing element places the respective solid-state switch in the off mode.

38. A programmable switch controller according to claim 36, wherein when the temperature of a respective solid-state switch is no less than a predetermined value the processing element operates the respective solid-state switch in the on mode, and wherein when the temperature is below the predetermined value the processing element places the respective solid-state switch in the off mode.

39. A programmable switch controller according to claim 24, wherein said at least one measuring element is capable of measuring at least one voltage drop across the at least one load, and wherein said processing element controls the mode of a respective solid-state switch depending upon a voltage drop across a respective load.

40. A programmable switch controller according to claim 39, wherein when the voltage drop across the at least one load is no more than a predetermined value the processing element operates the respective solid-state switch in the on mode, and wherein when the voltage drop exceeds the predetermined value the processing element places the respective solid-state switch in the off mode.

41. A programmable switch controller according to claim 39, wherein when the voltage drop across the at least one load is no less than a predetermined value the processing element operates the respective solid-state switch in the on mode, and wherein when the voltage drop the below the predetermined value the processing element places the respective solid-state switch in the off mode.

42. A system of remotely controlling at least one load, said system comprising:
a master controller for controlling an input current to the as least one load;
at least one slave controller disposed remote said master controller and proximate the at least one load, wherein said at least one slave controller is electrically connected between said master controller and the at least one load, and wherein said at least one slave controller comprises:
at least one solid-state switch capable of controllably altering the input current to the at least one load, wherein each said solid-state switch comprises:
a switching element electrically connected to the at least one load, wherein said switching element is capable of altering the input current to the at least one load; and
a drive element for providing the input current to the at least one load, wherein said switching element controls the input current provided by said drive element to said at least one load;
at least one measuring element for measuring at least one parameter associated with the at least one load and the at least one solid-state switch, wherein said solid-state switch controllably alters the input current to the at least one load according to the at least one parameter; and
a processing element electrically connected to said at least one solid-state switch and said at least one measuring element, and capable of controlling said at least one solid-state switch.

43. A system according to claim 42, wherein said switching element has a maximum current rating, and wherein said solid-state switch further comprises a switch-protection element electrically connected to said switching element and said drive element, wherein said switch-protection element is capable of sensing an actual current through said switching element and controlling the input current to the at least one load depending upon the actual current and the maximum current rating.

44. A system according to claim 43, wherein said switch-protection element is capable of controlling said drive element to provide the input current to a respective load such that the actual current through said switching element is no more than the maximum current rating.

45. A system according to claim 43, wherein when the actual current through said switching element exceeds the maximum current rating for more than a predefined period of time, said switch-protection element controls said drive element to thereby reduce the actual current through said switching element to no more than the maximum current rating.

46. A system according to claim 42, further comprising a user interface electrically connected to said master controller, wherein a user interacts with said user interface to control the input current to the at least one load.

47. A system according to claim 42, wherein said at least one measuring element is capable of measuring a voltage drop across a respective load, and wherein said processing element is capable of controlling said at least one solid-state switch according to the voltage drop across the respective load.

48. A system according to claim 42, wherein said at least one measuring element is capable of measuring a current through a respective load, and wherein said processing element is capable of controlling said at least one solid-state switch according to the current through the respective load.

49. A system according to claim 42, wherein said at least one measuring element is capable of measuring a temperature of said at least one solid-state switch, and wherein said processing element is capable of controlling said at least one solid-state switch according to the temperature of a respective solid-state switch.

50. A system according to claim 49 further comprising a memory device electrically connected to said processing element.

51. A system according to claim 42 further comprising a monitoring element electrically connected to said processing element and said at least one solid-state switch, wherein when said processing element fails to function properly by failing to control the input current, said monitoring element is capable of controlling said at least one solid-state switch to alter the input current to a predefined level.

52. A system according to claim 42, wherein said at least one solid-state switch operates in at least one mode selected from a group consisting of an on mode wherein said at least one solid-state switch permits a respective load to receive the input current, and an off mode wherein said at least one solid-state switch prevents the respective load from receiving the input current, and wherein said processing element controls the mode depending upon the at least one parameter.

53. A system according to claim 52, wherein each load has an input current rating, and wherein said processing element controls the mode of said at least one solid-state switch depending upon the input current and input current rating of a respective load.

54. A system according to claim 53, wherein when the input current to a respective load is no more than the input current rating of the load said processing element operates the respective solid-state switch in the on mode, and wherein when the input current to the load exceeds the input current rating the processing element places the respective solid-state switch in the off mode.

55. A system according to claim 53, wherein said processing element controls the mode of said at least one solid-state switch depending upon the input current, the input current rating of a respective load and an amount of time the load has received the input current.

56. A system according to claim 55, wherein when the input current to a respective load is no more than the input current rating of the load said processing element operates the respective solid-state switch in the on mode, and wherein when the input current to the load exceeds the input current rating for more than a predefined period of time the processing element places the respective solid-state switch in the off mode.

57. A system according to claim 56, wherein when the input current to a respective load exceeds the input current rating, said processing element repeatedly increases a count associated with an elapsed time until at least one occurrence selected from a group consisting of the input current reduces to no more than the input current rating and the count reaches a predetermined threshold representative of the predefined period of time, wherein when the input current reduces to no more than the input current rating, the processing element repeatedly decreases the count.

58. A system according to claim 52, wherein said at least one solid-state switch has a maximum current rating, wherein when the input current through a respective solid-state switch is no more than a respective maximum current rating said processing element operates the respective solid-state switch in the on mode, and wherein when the input current through said solid-state switch exceeds the respective maximum current rating said processing element places the respective solid-state switch in the off mode.

59. A system according to claim 52, wherein said at least one solid-state switch has a maximum current rating, wherein when the current through a respective solid-state switch exceeds a respective maximum current rating for more than a predefined period of time, said processing element places the respective solid-state switch in the off mode.

60. A system according to claim 52, wherein said processing element controls the mode of said at least one solid-state switch depending upon a temperature of a respective solid-state switch.

61. A system according to claim 60, wherein when the temperature of a respective solid-state switch is no more than a predetermined value the processing element operates the respective solid-state switch in the on mode, and wherein when the temperature exceeds the predetermined value the processing element places the respective solid-state switch in the off mode.

62. A system according to claim 60, wherein when the temperature of a respective solid-state switch is no less than a predetermined value the processing element operates the respective solid-state switch in the on mode, and wherein when the temperature is below the predetermined value the processing element places the respective solid-state switch in the off mode.

63. A system according to claim 52, wherein said processing element controls the mode of said at least one solid-state switch depending upon a voltage drop across a respective load.

64. A system according to claim 63, wherein when the voltage drop across a respective load is no more then a predetermined value the processing element operates the respective solid-state switch in the on mode, and wherein when the voltage drop exceeds the predetermined value the processing element places the respective solid-state switch in the off mode.

65. A system according to claim 63, wherein when the voltage drop across a respective load is no less than a predetermined value the processing element operates the respective solid-state switch in the on mode, and wherein when the voltage drop is below the predetermined value the processing element places the respective solid-state switch in the off mode.

66. A method of remotely controlling an input current from a master controller through at least one switch to at least one load, said method comprising:

configuring a processing element disposed remote the master controller and proximate the at least one load, wherein said configuring is based upon at least one characteristic selected from a group consisting of a current rating of each load, a voltage rating of each load, a maximum current rating of each switch and a temperature rating of each switch;

monitoring at least one parameter associated with each switch and respective load selected from a group consisting of the input current to the load, a voltage drop across the load, the input current through the switch and a temperature of the switch;

determining a condition of each switch and respective load depending upon at least one of the at least one characteristic and the at least one parameter;

operating each switch in at least one mode selected from a group consisting of an on mode wherein the switch permits the input current to flow to a respective load, and an off mode wherein the switch prevents the input current from flowing to the respective load, wherein the operating mode selected depends upon the condition of the respective loads.

67. A method according to claim 66, wherein said determining the condition comprises determining the condition of each load based upon the maximum current rating of the respective switch and the input current through the switch.

68. A method according to claim 67 wherein operating each switch comprises operating the in the on mode when the input current through the switch is no more than a respective maximum current rating, and operating the switch in the off mode when the input current through the switch exceeds the maximum current rating.

69. A method according to claim 67, wherein operating each switch comprises operating the switch in the off mode when the current through the switch exceeds the maximum current rating for more than a predefined period of time.

70. A method according to claim 66, wherein said determining the condition comprises determining the condition of each load based upon the current rating of the load and the input current to the load.

71. A method according to claim 70, wherein operating each switch comprises operating the switch in the on mode when the input current to a respective load is no more than a predetermined value relative to the current rating of the load, and operating the switch in the off mode when the input current to the load exceeds the predetermined value.

72. A method according to claim 70, wherein said determining the condition further depends upon an amount of time the load has received the input current.

73. A method according to claim 72, wherein operating each switch comprises operating the switch in the on mode when the input current to a respective load is no more than the input current rating of the load, and operating the switch in the off mode when the input current to the load exceeds the input current rating for more than a predefined period of time.

74. A method according to claim 73, wherein said determining the condition comprises repeatedly increasing a count associated with an elapsed time when the input current to a respective load exceeds the input current rating, wherein increasing the count comprises increasing the count until at least one occurrence selected from a group consisting of the input current reduces to no more than the input current rating and the count reaches a predetermined threshold representative of the predefined period of time, and wherein said determining the condition further comprises repeatedly decreasing the count when the input current reduces to no more than the input current rating.

75. A method according to claim 66, wherein said determining the condition comprises determining the condition of each switch based upon the temperature rating of the switch and the temperature of the switch.

76. A method according to claim 75, wherein said operating each switch comprises operating the switch in the on mode when the temperature of the switch is no more than a predetermined value relative to the respective temperature rating, and operating the switch in the off mode when the temperature exceeds the predetermined value.

77. A method according to claim 75, wherein said operating each switch comprises operating the switch in the on mode when the temperature of a respective solid-state switch is no less than a predetermined value relative to the respective temperature rating, and operating the switch in the off mode when the temperature is below the predetermined value.

78. A method according to claim 66, wherein said determining the condition comprises determining the condition of each load based upon the voltage rating of the load and the voltage drop across the load.

79. A method according to claim 78, wherein operating each switch comprises operating the switch in the on mode when the voltage drop across a respective load is no more then a predetermined value relative to the voltage rating of the load, and operating the switch in the off mode when the voltage drop exceeds the predetermined value.

80. A method according to claim 78, wherein operating each switch comprises operating the switch in the on mode when the voltage drop across a respective load is no less than a predetermined value relative to the voltage rating of the load, and operating the switch in the off mode when the voltage drop is below the predetermined value.

* * * * *